US008706906B2

(12) United States Patent
Hoynowski et al.

(10) Patent No.: US 8,706,906 B2
(45) Date of Patent: *Apr. 22, 2014

(54) MULTIPATH ROUTING PROCESS

(75) Inventors: Charles Hoynowski, Redwood City, CA (US); Daniel Hirschberg, Foster City, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/415,518

(22) Filed: Mar. 8, 2012

(65) Prior Publication Data

US 2012/0166639 A1    Jun. 28, 2012

Related U.S. Application Data

(63) Continuation of application No. 11/257,954, filed on Oct. 25, 2005.

(51) Int. Cl.
*G06F 15/173* (2006.01)
*G06F 15/16* (2006.01)
*G06F 15/177* (2006.01)
*H04L 12/56* (2006.01)
*H04L 29/06* (2006.01)

(52) U.S. Cl.
CPC .......... *H04L 45/20* (2013.01); *H04L 45/00* (2013.01); *H04L 45/22* (2013.01); *H04L 29/06027* (2013.01)
USPC .......... 709/238; 709/239; 709/240; 709/220; 709/221; 709/222; 709/223; 709/224; 709/225; 709/226; 709/227; 709/228; 709/229

(58) Field of Classification Search
USPC .......................... 709/203, 223–225, 238–240
See application file for complete search history.

(56) References Cited

U.S. PATENT DOCUMENTS

| 5,371,852 A | 12/1994 | Attanasio et al. |
| 5,661,719 A | 8/1997 | Townsend et al. |
| 5,862,348 A | 1/1999 | Pedersen |
| 6,006,264 A | 12/1999 | Colby et al. |
| 6,256,295 B1 | 7/2001 | Callon |
| 6,330,602 B1 | 12/2001 | Law et al. |

(Continued)

OTHER PUBLICATIONS

Y. Rekhter, P. Gross "Application of Border Gateway Protocok in the Internet", Network Working Group, RFC 1268, 1991.*

(Continued)

*Primary Examiner* — Catherine Thiaw
(74) *Attorney, Agent, or Firm* — Omkar K. Suryadevara; Silicon Valley Patent Group LLP (57) ABSTRACT

Methods and apparatus that enable more than one server to host a resource using a shared IP address such that a client may generally access the resource on any of the servers using the shared IP address are disclosed. According to one aspect of the present invention, a method for providing paths that allow a client to access a resource in a TCP/IP network includes obtaining an IP address, as well as associating the IP address to first and second servers. The first and second servers support the resource at the IP address, and a first path of the plurality of paths that allow the client to access the resource is between the client and the first server and a second path of the plurality of paths that allow the client to access the resource is between the client and the second server.

22 Claims, 7 Drawing Sheets

(56) References Cited

U.S. PATENT DOCUMENTS

| | | |
|---|---|---|
| 6,470,389 B1 | 10/2002 | Chung et al. |
| 6,487,555 B1 | 11/2002 | Bharat et al. |
| 6,611,861 B1 | 8/2003 | Schairer et al. |
| 6,697,333 B1 | 2/2004 | Bawa et al. |
| 6,785,704 B1 | 8/2004 | McCanne |
| 6,842,783 B1 | 1/2005 | Boivie et al. |
| 6,889,259 B2 | 5/2005 | Kapoor |
| 6,934,875 B2 | 8/2005 | Kashyap |
| 7,020,086 B2 | 3/2006 | Juttner et al. |
| 7,020,698 B2 | 3/2006 | Andrews et al. |
| 7,054,304 B2 * | 5/2006 | Wang ............................ 370/352 |
| 7,076,691 B1 * | 7/2006 | Dobberpuhl et al. ............ 714/13 |
| 7,124,187 B1 | 10/2006 | Kodialam et al. |
| 7,146,432 B2 | 12/2006 | Antes et al. |
| 7,286,479 B2 | 10/2007 | Bragg |
| 7,296,088 B1 | 11/2007 | Padmanabhan et al. |
| 7,430,611 B2 | 9/2008 | Aiken et al. |
| 7,535,826 B1 | 5/2009 | Cole et al. |
| 7,552,233 B2 | 6/2009 | Raju et al. |
| 7,574,499 B1 | 8/2009 | Swildens et al. |
| 7,650,427 B1 | 1/2010 | Liu et al. |
| 7,716,367 B1 | 5/2010 | Leighton et al. |
| 7,725,596 B2 | 5/2010 | Garcia-Luna-Aceves et al. |
| 7,860,016 B1 | 12/2010 | Vijendra et al. |
| 2002/0038360 A1 | 3/2002 | Andrews et al. |
| 2002/0091760 A1 | 7/2002 | Rozen |
| 2002/0138628 A1 * | 9/2002 | Tingley et al. ................. 709/227 |
| 2003/0005125 A1 * | 1/2003 | Berthaud et al. ............... 709/226 |
| 2003/0005350 A1 * | 1/2003 | Koning et al. ..................... 714/4 |
| 2003/0195984 A1 | 10/2003 | Zisapel et al. |
| 2003/0229697 A1 * | 12/2003 | Borella ........................... 709/226 |
| 2004/0047354 A1 * | 3/2004 | Slater et al. ..................... 370/400 |
| 2004/0078487 A1 | 4/2004 | Cernohous et al. |
| 2004/0205693 A1 | 10/2004 | Alexander et al. |
| 2005/0022203 A1 | 1/2005 | Zisapel et al. |
| 2005/0038909 A1 | 2/2005 | Yoshiba et al. |
| 2005/0071309 A1 | 3/2005 | Ustaris |
| 2005/0125557 A1 * | 6/2005 | Vasudevan et al. ............ 709/239 |
| 2005/0141506 A1 | 6/2005 | Aiken et al. |
| 2005/0172161 A1 * | 8/2005 | Cruz et al. ......................... 714/4 |
| 2006/0036761 A1 | 2/2006 | Amra et al. |
| 2006/0036762 A1 | 2/2006 | Vadlakonda et al. |
| 2006/0092950 A1 * | 5/2006 | Arregoces et al. ............. 370/396 |
| 2006/0112170 A1 | 5/2006 | Sirkin |
| 2006/0129695 A1 | 6/2006 | Faibish et al. |
| 2006/0165009 A1 | 7/2006 | Nguyen et al. |
| 2006/0168334 A1 | 7/2006 | Potti et al. |
| 2006/0182034 A1 * | 8/2006 | Klinker et al. ................. 370/238 |
| 2006/0193252 A1 * | 8/2006 | Naseh et al. ................... 370/225 |
| 2006/0227723 A1 | 10/2006 | Vasseur et al. |
| 2007/0005784 A1 | 1/2007 | Hares et al. |
| 2007/0091795 A1 | 4/2007 | Bonaventure et al. |
| 2007/0091796 A1 | 4/2007 | Filsfils et al. |
| 2007/0165516 A1 * | 7/2007 | Xu et al. ........................ 370/217 |
| 2008/0098127 A1 | 4/2008 | Engel |
| 2008/0263209 A1 * | 10/2008 | Pisharody et al. ............. 709/227 |

OTHER PUBLICATIONS

Dina Katabi, John Wroclawski: "A framework for scalable global IP-anycast (GIA)", Proceedings of the conferecne on Applications, Technologies, Architectures, and Protocols for Computer Communication SIGCOMM'00, New-York, 2000, pp. 3-15.*
Response to Amendment dated Mar. 20, 2012 in U.S. Appl. No. 11/257,954, pp. 2.
J. Hawkinson and T. Bates, "Guidelines for creation, selection and registration of an Autonomous system (AS)", Network Working Group, RFC 1930, Mar. 1996, pp. 21.
U.S. Appl. No. 11/257,954, pp. 32.
Office Action dated Dec. 15, 2008 in U.S. Appl. No. 11/257,954, pp. 23.
Amendment dated Apr. 6, 2009 in U.S. Appl. No. 11/257,954, pp. 26.
Office Action dated Jul. 31, 2009 in U.S. Appl. No. 11/257,954, pp. 36.
Amendment dated Nov. 2, 2009 in U.S. Appl. No. 11/257,954, pp. 19.
Final Office Action dated Jan. 14, 2010 in U.S. Appl. No. 11/257,954, pp. 40.
Amendment after Final Office Action dated Apr. 14, 2010 in U.S. Appl. No. 11/257,954, pp. 16.
Advisory Action dated May 3, 2010 in U.S. Appl. No. 11/257,954, pp. 3.
Amendment filed with RCE dated May 14, 2010 in U.S. Appl. No. 11/257,954, pp. 16.
Office Action dated Jul. 8, 2010 in U.S. Appl. No. 11/257,954, pp. 41.
Amendment dated Oct. 9, 2010 in U.S. Appl. No. 11/257,954, pp. 19.
Final Office Action dated Dec. 22, 2010 in U.S. Appl. No. 11/257,954, pp. 43.
Amendment filed with RCE dated May 21, 2011 in U.S. Appl. No. 11/257,954, pp. 16.
Examiner's Interview Summary dated Jun. 1, 2011 in U.S. Appl. No. 11/257,954, pp. 3.
Office Action dated Aug. 3, 2011 in U.S. Appl. No. 11/257,954, pp. 35.
Amendment dated Nov. 3, 2011 in U.S. Appl. No. 11/257,954, pp. 17.
Notice of Allowance dated Dec. 7, 2011 in U.S. Appl. No. 11/257,954, pp. 25.
Amendment after Notice of Allowance dated Mar. 7, 2012 in U.S. Appl. No. 11/257,954, pp. 17.

* cited by examiner

MULTIPATH ROUTING PROCESS

CROSS-REFERENCE TO PARENT APPLICATION

This application is a continuation application of U.S. patent application Ser. No. 11/257,954 entitled "MULTIPATH ROUTING PROCESS" filed on Oct. 25, 2005 by Charles Hoynowski et al, which is incorporated by reference herein in its entirety.

RE-VISIT NOTICE

Applicant(s) hereby rescind any disclaimer of claim scope in the parent application (namely U.S. application Ser. No. 11/257,954) and in the prosecution history thereof, and hereby advise the US Patent and Trademark Office (USPTO) that the claims in this continuation application may be broader than any claim in the parent application. Accordingly, Applicant(s) notify the USPTO of a need to re-visit the disclaimer of claim scope in the parent application, and to further re-visit all prior art cited in the parent application, including but not limited to cited references over which any disclaimer of claim scope was made in the parent application, and in the prosecution history thereof. See *Hakim v. Cannon Avent Group, PLC,* 479 F.3d 1313 (Fed. Cir. 2007). Moreover, any disclaimer made in the current application should not be read into or against the parent.

BACKGROUND OF THE INVENTION

1. Field of Invention

The present invention relates to network systems. More specifically, the invention relates to efficiently routing traffic between a client and a website associated with a web address, even when transparent fail-over is needed.

2. Description of the Related Art

As the use of the World Wide Web continues to increase, the ability to allow a client or a user to continue accessing a website even when a web server associated with the website goes off line or otherwise fails may be critical. If a user is transacting business through the website, the inaccessibility of the website for even a relatively short amount of time may be unacceptable. In the event of a failure of a web server, i.e., a web server with a first IP address associated with a website, the owner of the website may direct traffic to a different web server, i.e., a web server with a second IP address associated with the website. That is, the owner or administrator of the website may effectively change the IP address of the website.

Figure 1A:
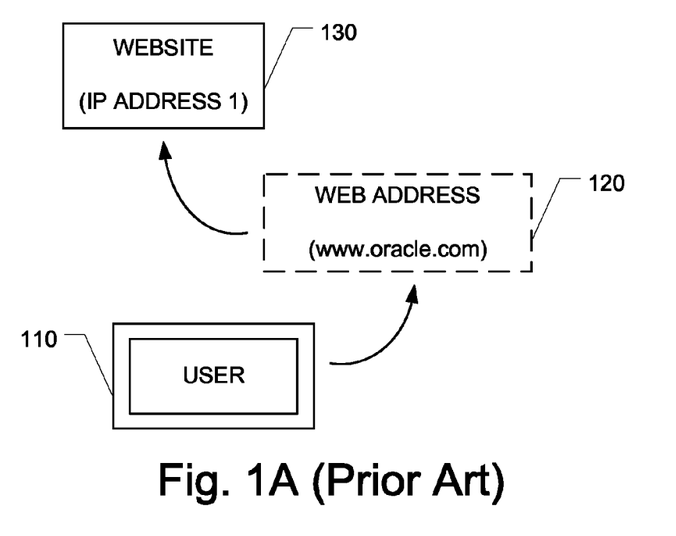
FIG. 1A is a diagrammatic representation of a user accessing a website that is accessible through the use of a web address.

As shown in FIG. 1A, when a user 110 attempts to access a web server associated with a website 130 using a web address 120, e.g., www.oracle.com, web address 120 is effectively mapped to a first IP address associated with website 130. As such user 110, who may generally be operating a computing system on which a browser is executing, accesses website 130, although user 110 may not be aware of the first IP address associated with website 130. As will be appreciated by those skilled in the art, the first IP address is an address for the web server associated with website 130.

Figure 1B:
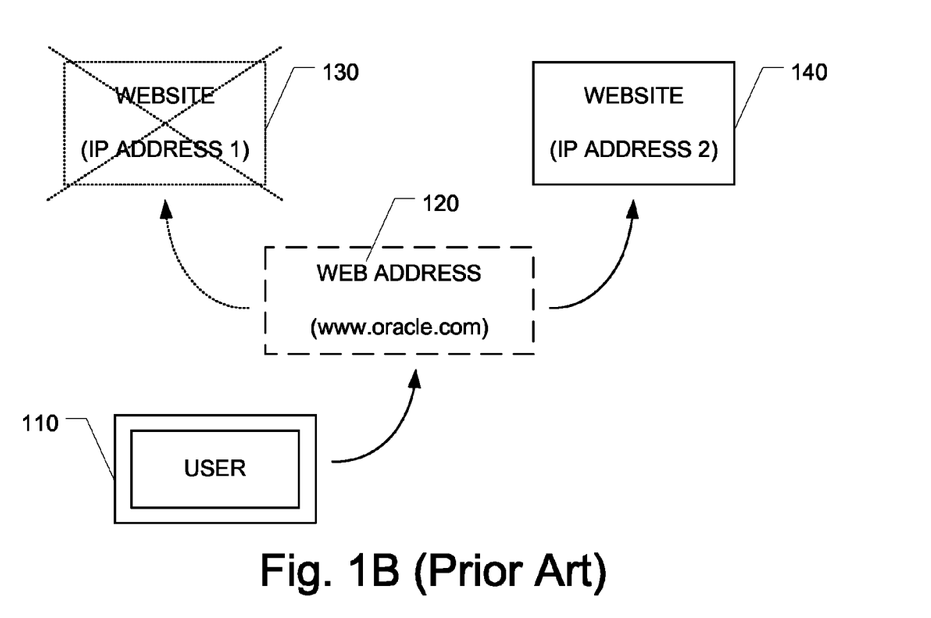
FIG. 1B is a diagrammatic representation of a user accessing a website through the use of a web address at a second IP address when a first IP address for the website is not working.

When the web server associated with website 130 is inaccessible, as indicated in FIG. 1B, accessing website 130 using the first IP address associated with website 130 is typically no longer possible. That is, web address 120 no longer allows access to website 130 at the first IP address associated with website 130. Hence, the owner of website 130 may redirect traffic, as for example TCP traffic, to a web server associated website 140 at a second IP address. By way of example, when user 110 first attempts to access a website associated with web address 120 and website 130 is not accessible, user 110 generally accesses website 140. Upon access to website 140, the second IP address associated with website 140 may then be mapped to web address 120. The ability for user 110 to access website 140 when website 130 is inaccessible substantially without user 110 being aware of the inaccessibility of website 130 is typically known as a transparent fail-over.

Figure 2:
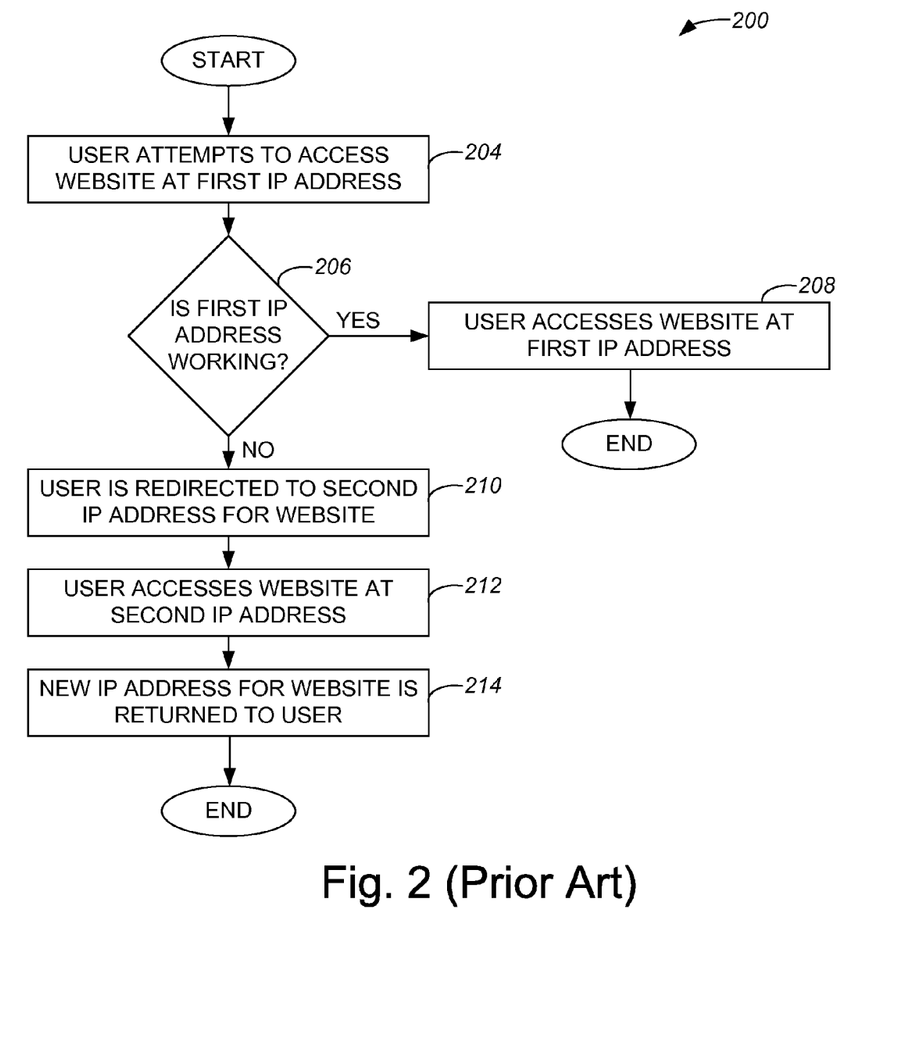
FIG. 2 is a process flow diagram which illustrates the steps associated with one conventional method of obtaining access to a website.

FIG. 2 is a process flow diagram which illustrates the steps associated with a user gaining access to a website. A process 200 of gaining access to a website begins at step 204 in which a user attempts to access a website at a first address. The first address is an IP address which is associated with the website, as previously mentioned. The user may, for example, attempt to access the website by entering a web address or a domain name, e.g., www.oracle.com, into an appropriate field in a web browser executing on a computing system which is in communication with a network which is arranged to permit access to the website. A determination is made in step 206 as to whether the first IP address is working. That is, it is determined in step 206 whether the server associated with the first IP address is on-line and accessible.

If the determination in step 206 is that the first IP address is working, then the user accesses the website at the first IP address in step 208, and access to the website is effectively gained. Alternatively, if the determination in step 206 is that the first IP address is not working, then process flow proceeds to step 210 in which the user is redirected to a second IP address associated with the website. The user then accesses the website at the second IP address in step 212. It should be appreciated that in the event that the website at the second IP address is inaccessible, the user may either be directed to access the website at a third IP address, or the user may be notified that the website is not currently accessible. However, for ease of discussion, it is assumed that the user is able to access the website at the second IP address.

After the user accesses the website at the second IP address in step 212, the new IP address, i.e., the second IP address, for the website is returned to the user in step 214 and the process of gaining access to the website is completed. After the new IP address is effectively set as the IP address to use to access the website, when the user tries to access the website at a later point in time, the website may be accessed at the new IP address. It should be understood, however, that until the new IP address is effectively set as the IP address to use to access the website, when the user attempts to access the website, the user may still be attempting to access the website at the old IP address, i.e., the first IP address. Due to propagation issues, it may sometimes take a relatively long time before the new IP address is set as the IP address to use to access the website. That is, IP address change propagation issues may cause a transparent fail-over process to take longer than desired when the time delay for a new IP address to be mapped to the web address used to access a website is relatively high.

When a new IP address is not relatively efficiently mapped to a web address when the original IP address associated with the website may not be used to access the website, a user may not be able to obtain any updates to the website. As such, the user may not have access to the most up-to-date information or service, e.g., Internet service, associated with the website. A transparent fail-over process from the original IP address to the new IP address may not be considered as successfully completed until such time as the new IP address is mapped to the web address for the website.

Until a new IP address is mapped to the web address for a website, whenever access to the web address is requested, access to the website through the original IP address is first attempted. It is only when access to the website through the original IP address is not granted that access through the new IP address is attempted. Having to attempt to access a website through a plurality of IP addresses is inefficient as it may significantly increase the access time associated with accessing the website.

While the speed with which an IP address change propagation occurs may be increased to some extent, increasing the speed generally results in a relatively significant load impact, which is often impractical and, in many instances, not feasible. Further, a relatively high error rate is typical of an IP address change propagation.

Therefore, what is needed is an efficient method for providing and completing a transparent fail-over process for providing access to a website. That is, what is desired is a method and an apparatus for increasing survivability of Internet service in the event of a failure, and for decreasing website access times.

SUMMARY OF THE INVENTION

The present invention relates to a system which enables more than one server to effectively host a resource using a shared IP address such that a client may access the resource using different paths to different servers. According to one aspect of the present invention, a method for providing a plurality of paths that allow a client to access a resource such as a website in a TCP/IP network includes obtaining an IP address, as well as associating the IP address to a first server and to a second server. The first and second servers support the website at the IP address, and a first path of the plurality of paths that allow the client to access the website is between the client and the first server and a second path of the plurality of paths that allow the client to access the website is between the client and the second server.

In one embodiment, obtaining the IP address includes associating a domain name with the IP address, and the method also includes initiating a TCP session between the client and one of the servers to allow the client to access the website. In such an embodiment, initiating the TCP session may involve determining whether to use the first path to allow the client to access the website at the IP address on the first server, and using the first path to allow the client to access the website when appropriate.

The ability for a network resource such as a website to be associated with more than one server using a common IP address allows the efficiency with which the website may be accessed to be increased. When there are multiple servers which host the resource, the actual server to use in the establishment of a TCP session may be selected based on balancing the load on the servers, the physical proximity of the servers to a client or a user, the lengths of paths between the client or user and the servers, and the availability of the servers. Hence, the most efficient path may effectively be selected by a system for use in establishing the TCP session. The time needed to gain access to a website may also be decreased, since IP address change propagation may be avoided due to the fact that the website is hosted at the same IP address by different servers. Avoiding IP address change propagation substantially eliminates the load impact associated with propagating an IP address change, and allows the server on which the website is accessed to be changed substantially transparently.

According to another aspect of the present invention, a system for providing a plurality of paths that allow a client to access a website in a TCP/IP network includes means for associating the domain name for the website to a corresponding IP address, and means for associating the IP address to a first server and to a second server. The first server supports the website at the IP address and the second server supports the website at the IP address. In one embodiment, the system also includes means for initiating a TCP session between the client and one of the first server and the second server to allow the client to access the website.

In accordance with still another aspect of the present invention, an apparatus for providing a client with access to a website that is associated with a domain name includes a server arrangement and a router arrangement. The server arrangement receives a request from the client to provide an IP address associated with the website. The server arrangement is arranged to translate the domain name into the IP address. The router arrangement provides the client with access to one of a plurality of servers associated with the IP address. Each one of the servers associated hosts the website using the IP address.

In one embodiment, a first path of a plurality of paths is arranged between the client and a first server, and a second path is arranged between the client and a second server. In such an embodiment, the router arrangement is arranged to select either the first path or the second path for use in providing the client with access to the website. In another embodiment, the router arrangement includes a router and a load balancer. The load balancer cooperates with the router to select the first path for use in providing the client with access to the website when the first path is either the least loaded of the paths or the shortest of the paths.

According to yet another aspect of the present invention, a method for providing a client with access to a website includes receiving a request to access an IP address associated with a domain name of the website. The IP address is also associated with a plurality of servers arranged to host the website at the IP address. The method also includes identifying a first server of the plurality of servers for use in establishing a TCP session for the client to access the website at the IP address, and establishing the TCP session between the client and the first server.

Other features and advantages of the invention will become readily available apparent upon review of the following description in association with the accompanying drawings, where the same or similar structures are designated with the same reference numerals.

BRIEF DESCRIPTION OF THE DRAWINGS

The invention may best be understood by reference to the following description taken in conjunction with the accompanying drawings in which.

DETAILED DESCRIPTION OF THE EMBODIMENTS

In the description that follows, the present invention will be described in reference to embodiments that test subsystems on a platform for a software application, such as a database application. However, embodiments of the invention are not limited to any particular architecture, environment, application, or implementation. For example, although embodiments will be described in reference to network database applications, the invention may be advantageously applied to any software application. Therefore, the description of the embodiments that follows is for purposes of illustration and not limitation.

When a web server associated with a first IP address that corresponds to a web address for a website becomes inaccessible, traffic, as for example Transmission Control Protocol (TCP) traffic, is redirected to a "back up" web server associated with a second different IP address that corresponds to the web address. Until the second different IP address is effectively mapped to the web address for the website, whenever access to the web address is requested, access to the website is generally attempted using the first IP address. Hence, there is often a delay before the website is accessed, as both the first IP address and the second different IP address may effectively be processed before the website is successfully accessed. Increasing the speed with which an IP address change propagation occurs may result in a relatively significant load impact, which is typically impractical.

Allowing more than one web server, as for example a web servers in different autonomous system, to be associated with the same IP address for a web address increases the efficiency with which a website may be accessed in the event that a web server goes from an available status to an unavailable status. In other words, when a plurality of web servers is arranged to allow access to the same website using the same IP address, the need to ever propagate an IP address change is effectively eliminated. Further, multiple paths may be provided for clients to access the website when the clients request access to the website or, in one embodiment, information stored on a database that is accessed through the website.

Providing multiple paths to a website, i.e., allowing multiple servers to effectively share an IP address, allows access to the website to be more efficient. By way of example, in an active/active system in which at least two of the multiple servers that share an IP address for a website are active at the same time, each client may access the website that it is closest to, or each client may access its lowest cost website. Alternatively, in an active/standby system in which one of the servers that shares an IP address for a website is active at any given time, access to the website is still more efficient because when one server becomes inaccessible, then another server may be accessed without substantially requiring that IP address change propagation occurs, thereby allowing a move from one server to another to be relatively transparent and relatively fast. That is, in an active/standby system, when an IP address for a website is shared, a transparent fail-over may occur with a high level of efficiency.

Figure 3:
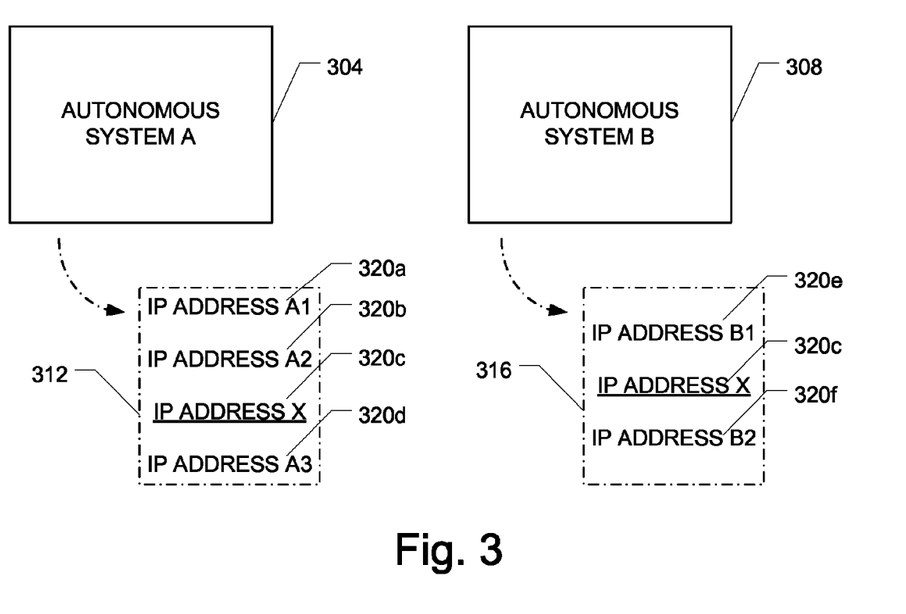
FIG. 3 is a representation of two autonomous systems which include containers that have the same IP address in accordance with an embodiment of the present invention.

The same IP address may generally be associated with different autonomous systems, as the autonomous systems are substantially separate and use an external gateway protocol to route packets between each other. That is, the same. IP space may be present in two autonomous systems. A border gateway protocol effectively enables servers in different autonomous systems to share a common IP address. As shown in FIG. 3, an autonomous system 'A' 304 has an associated container 312 which contains a list of IP addresses 320*a-d* which are used within autonomous system '1" 304. An autonomous system 'B' 308, which may be in communication with autonomous system 'A' 304 either directly or indirectly, has an associated container 316 which contains a list of IF addresses 320*c*, 320*e*, 320*f*. IP address 320*c* is common to both container 312 and container 316. Hence, when a user or a client (not shown) attempts to access a website associated with IP address 320*c*, access may be granted-through either autonomous system 'A' 304 or autonomous system 'B' 308. More specifically, access to the website associated with IP address 320*c* may be achieved by either accessing a server within autonomous system 'A' 304 or accessing a server within autonomous system 'B' 308.

Figure 4:
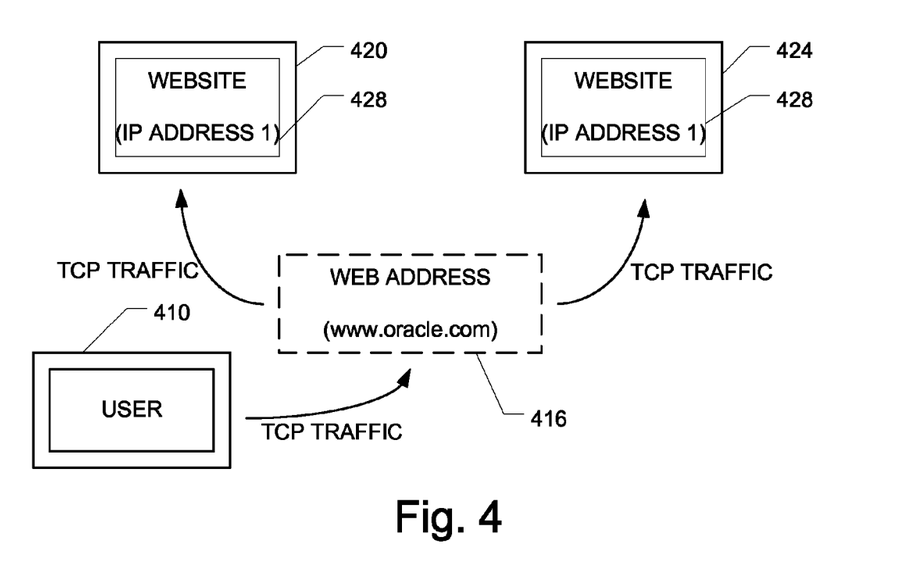
FIG. 4 is a diagrammatic representation of a user accessing either of two websites which are associated with separate web servers but have the same IP address in accordance with an embodiment of the present invention.

Referring next to FIG. 4, the availability of a website at the same IP address on more than one web server will be described in accordance with an embodiment of the present invention. When a user 410 attempts to access a website 428, e.g., when user 410 attempts to establish a TCP session with website 428 either through a first web server 420 or through a second web server 424, user 410 may enter a web address 416 into a web browser. As previously mentioned, web servers 420, 424 may be associated with different autonomous systems. Web servers 420, 424 may include any number of components including, but not limited to, memory for storing code devices associated with website 428, databases for storing information that may be accessed through website 428, and processors which enable code devices to execute. Typically, the web browser is executing on a computing system (not shown) associated with user 410.

Web address 416 is generally translated into an IP address which, in the described embodiment, is associated with website 428, and is effectively stored in containers associated with both web server 420 and web server 424. The translation of web address 416 into an associated IP address and, further, the selection of one of web servers 420, 424 for use in accessing website 428 will be discussed below with respect to FIG. 5. It should be appreciated that in some instances, as for example in an active/standby system, although both web servers 420, 424 may be associated with website 420 using the same IP address, only one of web servers 420, 424 may be active at any given time.

Figure 5:
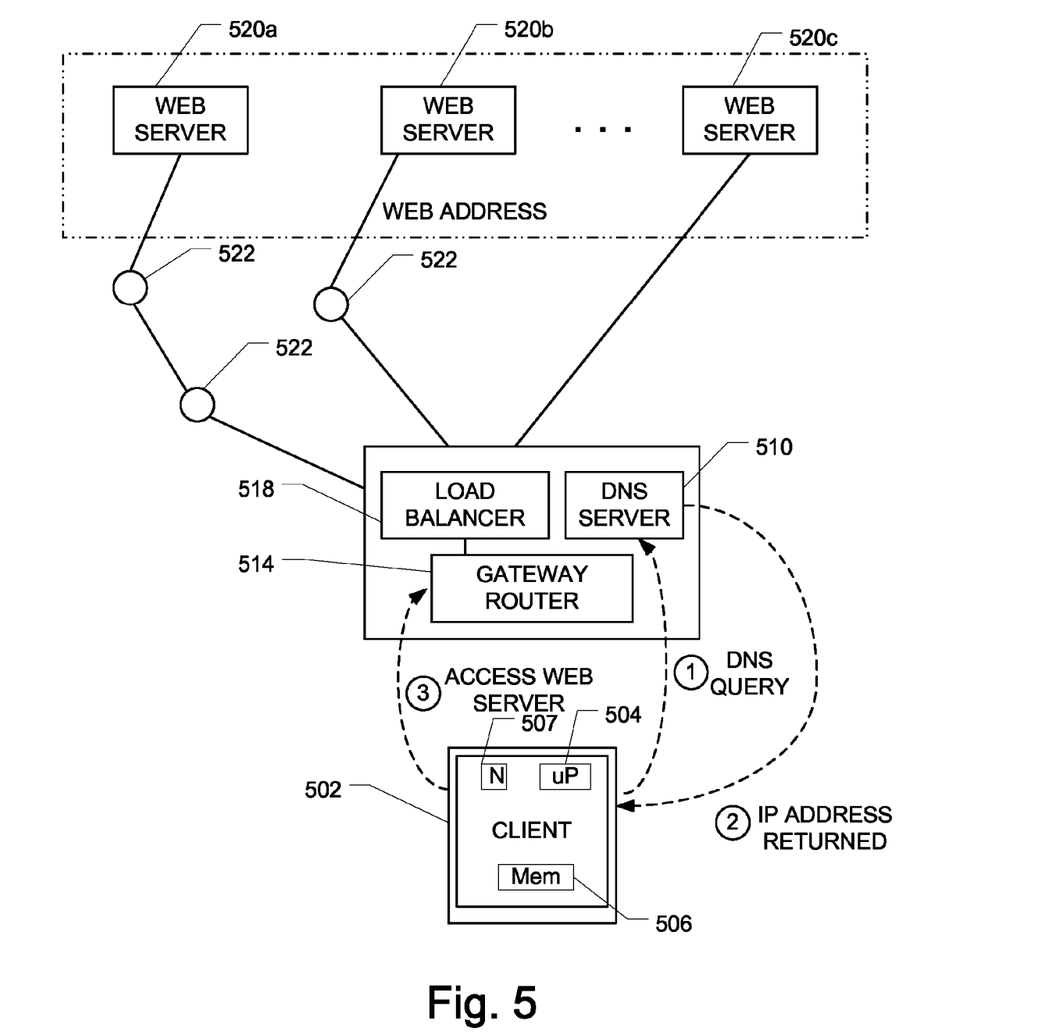
FIG. 5 is a diagrammatic representation of a process of accessing a web server during a TCP session in accordance with an embodiment of the present invention.

FIG. 5 is a diagrammatic representation of a process of accessing a web server during a TCP session in accordance with an embodiment of the present invention. As will be appreciated by those skilled in the art, during TCP sessions, requests to access a web server are generally hypertext transfer protocol (HTTP) requests. HTTP defines how messages are formatted and transmitted, and what actions web servers and browser may take in response to various commands, as for example commands substantially originating from a client. When a Uniform Resource Locator (URL) is entered into a browser of a client, an HTTP command is eventually sent to a web server to direct the web server to fetch and to transmit a requested web page.

A client 502, which is often a computing system that includes a processor 504 and a memory 506, is arranged to query a Domain Name Server (DNS) server 510. As will be appreciated by those skilled in the art, client 502 also generally includes a network connection 507 which enables client 502 to access a plurality of web servers 520a-c, as for example via a network connection. Other components of client 502 may include, but are not limited to, a database, random access memory, read only memory, input devices, display devices, and various computer readable media which are capable of storing code devices. Various computer readable media may include such media as digital versatile discs (DVDs), CD-ROMS, diskettes, tapes, and flash memory devices.

When client 502 attempts to access a website, client 502 may access the website through any web server 520a-c that is associated with the website. It should be appreciated that client 502 and web servers 520a-c may generally be in communication over an overall TCP/IP network. Client 502 may gain access to a website that is associated with any of web servers 520a-c by first sending a DNS query to DNS server 510. A DNS query is generally a query to obtain an IP address that corresponds with a domain name provided in the query. DNS server 510, which may be part of an overall "black box" system which provides client 502 with access to one of the plurality of web servers 520a-c associated with a web address, is arranged to translate web addresses or domain names into the IP addresses which correspond to the web addresses. In one embodiment, the black box system may be implemented as a computing system which accepts information from client 502 in a format that includes code devices embodied in a carrier wave. When the black box system is a computing system, the black box system may include a processor, memory, and various computer readable media on which code devices, e.g., code devices associated with translating web addresses into IP addresses, are stored.

Once the DNS query is sent to the DNS server 510, DNS server 510 returns an IP address, i.e., the IP address associated with a website client 502 wishes to access, to client 502. In the described embodiment, the IP address returned is an IP address associated with web servers 520a-c. In general, client 502 may cache the IP address for a given amount of time, i.e., a time-to-live may be associated with the IP address. At such time as the time-to-live expires, when access to the website which was associated with the IP address is desired, client 502 typically sends a new DNS query to DNS server 510. While the IP address is cached, when access to the website associated with the IP address is desired, client 502 may use the cached IP address rather than request an IP address from DNS server 510.

Using the IP address returned by DNS server 510, client 502 may attempt to access one of web servers 520a-c through a gateway router 514, which may also be a part of the black box in which DNS server 510 is included. Gateway router 514 is effectively a node which enables client 502 to gain access to a network which includes or serves web servers 520a-c. As will be associated by those skilled in the art, gateway router 514 may run a border gateway protocol. In one embodiment, when client 502 is a personal computer at the home of a user, gateway router 514 may be associated with an Internet Service Provider (ISP) that connects client 502 to the Internet. Gateway router 514 is arranged to select a path for client 502 to use to access one of web servers 520a.

In an active-active system, i.e., when each web server 520a-c is active, a selection as to which web server 520a-c is to be used by client 502 to effectively access a website associated with a web address may be based upon the relative loads supported by each web server 520a-c. A load balancer 518, which may also be part of the black box, is arranged to allocate requests for access to a web address among web servers 520a-c in order to equalize the loads handled by each web server 520a-c. In cooperation with load balancer 518, gateway router 514 effectively selects which of web servers 520a-c client 502 accesses when client 502 attempts to access a web address. Often, a path between client 502 and a web server 520a-c which is least busy may be selected by gateway router 514. Alternatively, a path may be selected based on the shortest physical distance between client 502 and any of web servers 520a-c, or a path may be selected based on minimizing the number of nodes 522 and, hence, the number of hops, traversed by a path. It should be appreciated that in an active/standby system, i.e., in a system in which only one of web servers 520a-c is active at any given time, load balancer 518 may not be necessary, as there may only be one path through which access to a website associated with a web address may be obtained.

Figure 6:
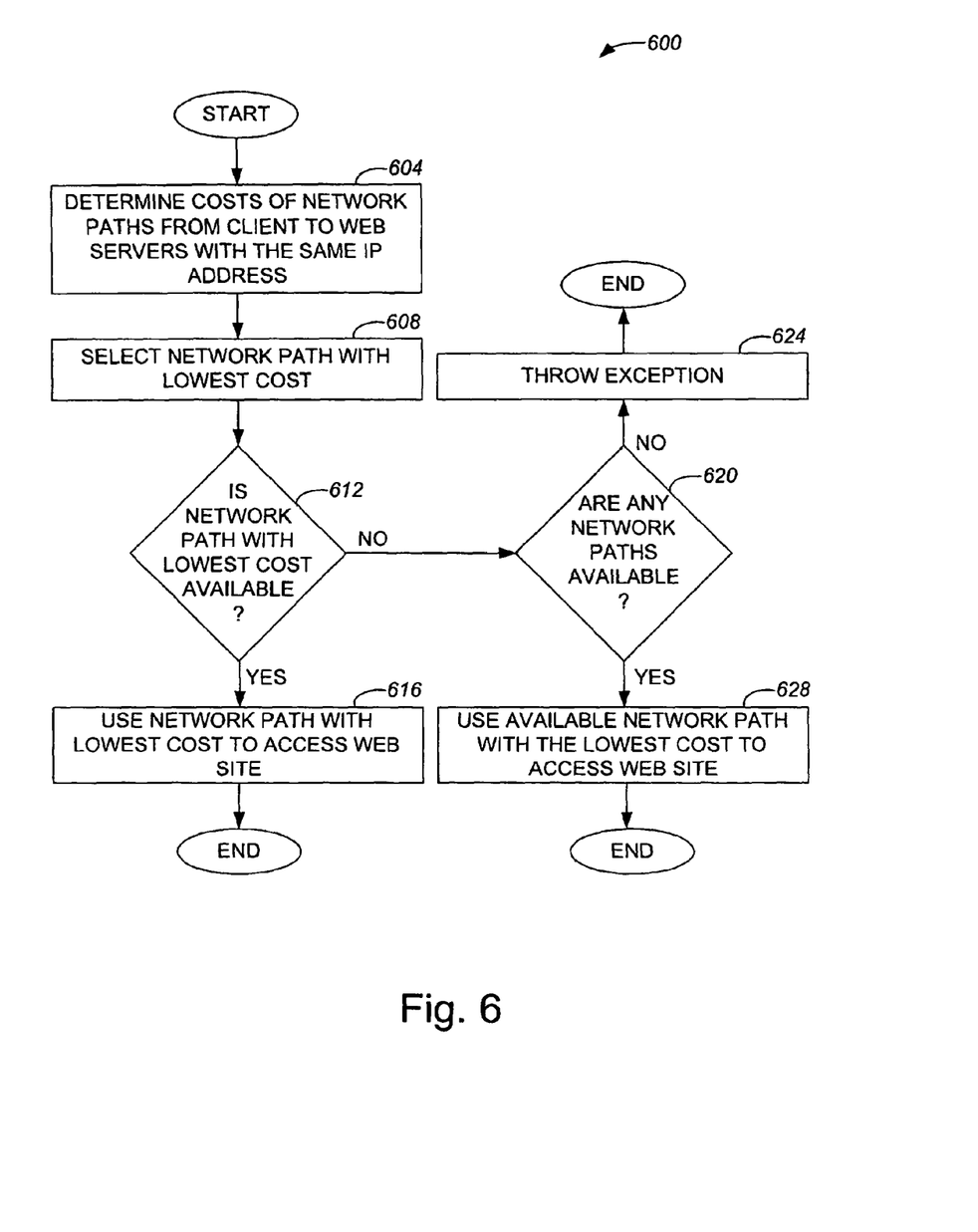
FIG. 6 is a process flow diagram which illustrates one active/standby method for accessing a website through a network path between a client a web server which shares an IP address with other web servers in accordance with an embodiment of the present invention.

In an active/standby system, substantially only one of a plurality of servers or devices which share an IP address is active at any given time. Hence, once a path to one of the servers is selected for use by the client to access a website, the client continues to use that path since that path would generally be the only path available for use in accessing the website. Referring next to FIG. 6, the steps associated with one active/standby method for accessing a website through a network path between a client a web server which shares an IP address with other web servers will be described in accordance with an embodiment of the present invention. A process 600 of accessing a website begins at step 604 in which costs of network paths between a client and web servers which share the same IP address. Calculating the costs may include, but is not limited to including, determining the number of hops associated with each path, the overall distance traversed by each path, and the bandwidth typically available on each path.

In step 608, the network path with the lowest cost is selected from among all network paths between the client and the web servers. A determination is then made in step 612 regarding whether the network path with the lowest cost is available. Determining whether the network path with the lowest cost is available may involve determining whether there is bandwidth available on the network path with the lowest cost, or whether the network path with the lowest cost is functional.

If the determination is that the network path with the lowest cost is available, then process flow moves from step 612 to step 616 in which the network path with the lowest cost is used to access the website. Once the network path with the lowest cost is used to access the website, the process of accessing a website is completed. Alternatively, if it is determined in step 612 that the network path with the lowest cost is not available, the indication is that another network path should be selected. When the network path with the lowest cost is not available, a determination is made in step 620 as to whether there are any network paths available between the client and a web server associated with the website available. If it is determined that there are no network paths available, the indication is that the client may not access the website through any path. As such, an exception is thrown in step 624, and the process of accessing a website is terminated.

If, however, the determination in step 620 is that there are network paths available, then the available network path with the lowest cost is selected for use in accessing the website. That is, the available network path with the lowest cost is used to access the website. Once the available network path with the lowest cost is selected, the process of accessing a website is completed.

Figure 7A:
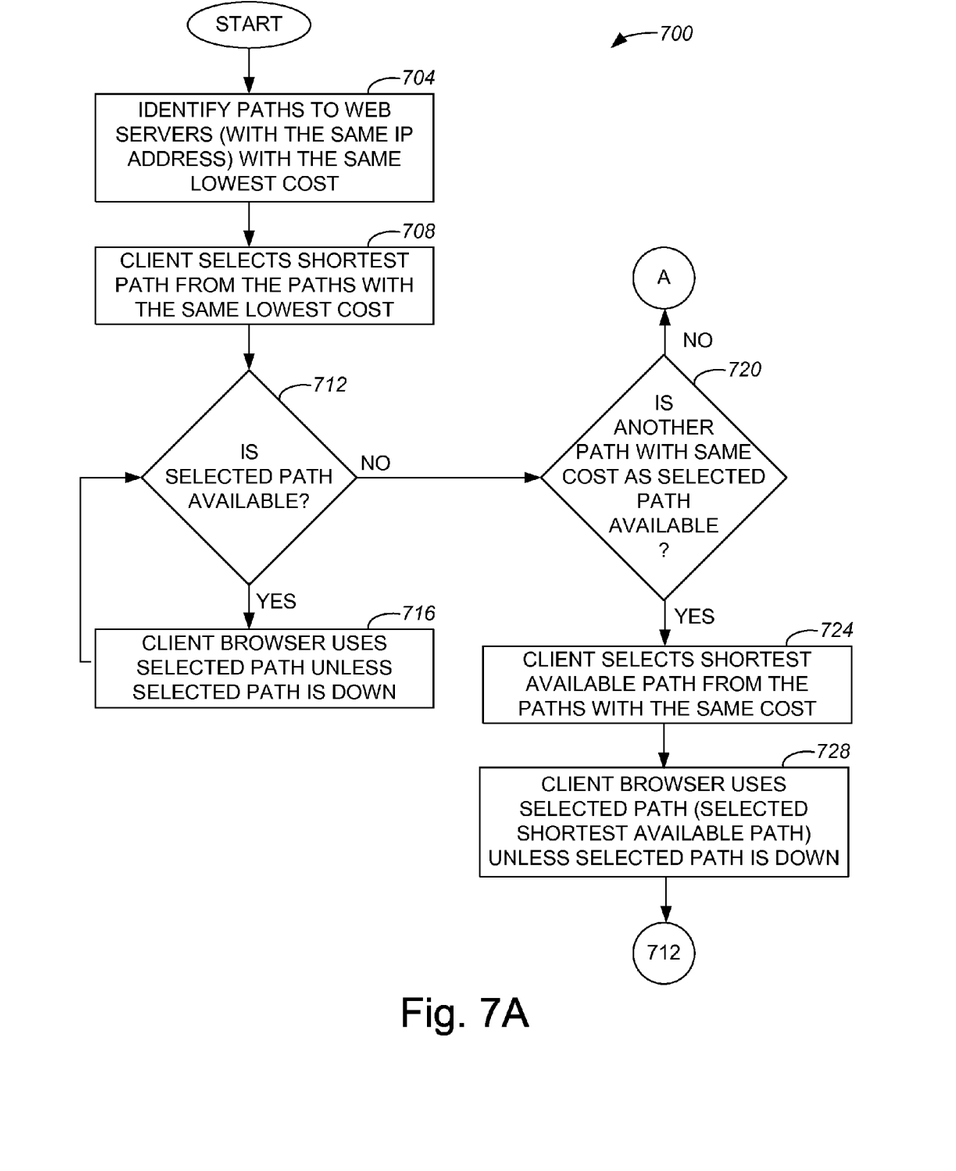
FIGS. 7A and 7B are a process flow diagram which illustrates one active/active method of accessing a website which is associated with a plurality of web servers that share an IP address.
Figure 7B:
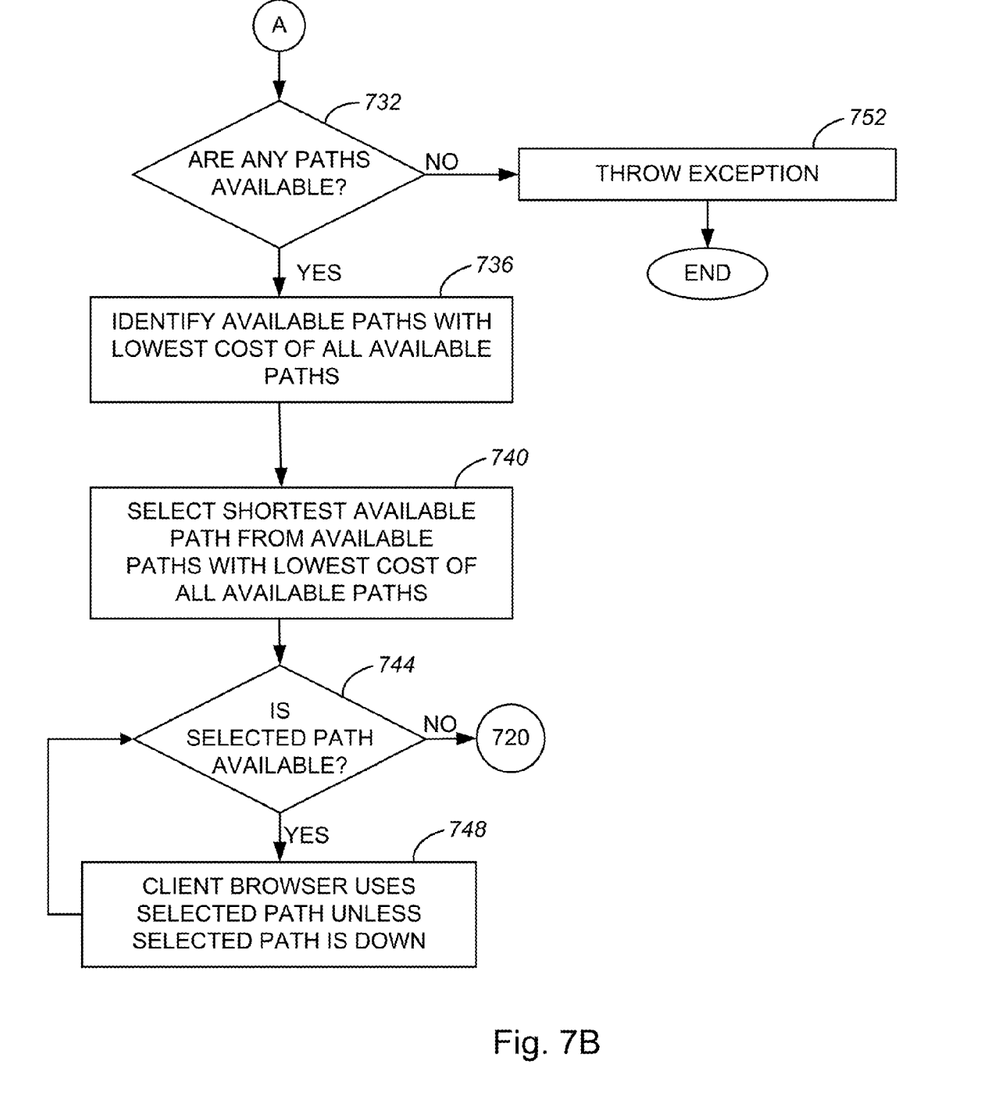

FIGS. 7A and 7B are a process flow diagram which illustrates one active/active method of accessing a website which is associated with a plurality of web servers that share an IP address. As previously mentioned, in an active/active system, the plurality of web servers that share an IP address are all active. A process 700 of accessing a website begins at step 704 in which paths, i.e., paths between a client and web servers with the same IP address, with the same lowest cost of all paths between the client and web servers are identified. Once the paths with the same lowest cost are identified, the client selects the shortest path from the paths with the same lowest cost in step 708. The shortest path of the paths with the same lowest cost may be the path from the client to a web server which is the physically closest web server to the client.

It should be appreciated that when the length of a path is a criterion for calculating the cost of a path, the paths with the same lowest cost may both be the shortest path. When two paths have the same path length, the selected path may be selected using another criterion, e.g., the path may be selected based on links or nodes which are preferred.

After the shortest path is selected in step 708, process flow proceeds to step 712 in which it is determined if the selected path is available. The selected path may be determined as being available when there is bandwidth available on the selected path for accommodating data, and when all links and nodes associated with the selected path are functional, e.g., on-line and "up" or in service. If it is determined that the selected path is available, then in step 716, a browser of the client uses the selected path to access the website unless the selected path is "down." A path which is in use may eventually go down due to a node failure or a link failure. As such, during the course of using the selected path, process flow returns to step 712 in which it is determined if the selected path is available.

If the determination in step 712 is that the selected path is not available, then in step 720, it is determined whether there is another path available which has the same cost as the selected path. If it is determined that there is an available path with the same cost as the selected path, the client selects that path in step 724 from among a set of paths with the same cost. In one embodiment, there may only be one path included in the set of paths with the same cost, i.e., the path selected in step 724 may be the only available path with the lowest available cost. Once the shortest available path is selected, a browser associated with the client uses the selected shortest available path to access the website, unless the selected path is down. The selected path is effectively monitored to determine if it remains available. Hence, process flow essentially returns from step 728 to step 712 in which it is determined if the selected path remains available.

Returning to step 720, if it is determined that another path with the same cost as the selected path is not available, the indication is that the client will have to utilize a path with a higher cost to access the website. As such, it is determined in step 732 whether there are any paths available between the client and any of the web servers which have the same IP address. If it is determined that there are no available paths, then an exception is thrown in step 752, and the process of accessing a website is terminated. Alternatively, if it is determined in step 732 that there is at least one available path, then any available path, or available paths, with the lowest cost of all available paths is identified in step 736. Once the available path is identified, or the available paths are identified, the shortest available path is selected in step 740. That is, the shortest available path of all available paths with the lowest cost is selected.

A determination is made in step 744 as to whether the selected path is available. If it is determined that the selected path is not available, then the indication is that the selected path has gone down or off line since its selection. Accordingly, process flow returns to step 720 in which it is determined whether another path with the same cost as the selected path is available. On the other hand, if it is determined that the selected path is available, then the browser associated with the client uses the selected path as long as the selected path is up or on line. As previously mentioned, a selected path is generally monitored to determine when it may go down or off line. As such, process flow moves from step 748 back to step 744 in which it is determined whether the selected path is available.

Although only a few embodiments of the present invention have been described, it should be understood that the present invention may be embodied in many other specific forms without departing from the spirit or the scope of the present invention. By way of example, the use of the same IP address to identify more than one server has been described in terms of web servers. However, the use of the same IP address to identify more than one server is not limited for use to web servers. Aspects of the present invention may generally apply to any suitable Internet-based systems and services. That is, in lieu of a website, the assignment of the same IP address relative to more than one server for use in accessing a resource may relate to substantially any suitable resource.

A black box or system which is used to allow a client to access more than one server that has the same IP address has generally been described as including a DNS server, a gateway router, and a load balancer. Such a system is not limited to including a DNS server, a gateway router, and a load balancer. Other components, including but not limited to a firewall, may also be included in such a system.

Additionally, while FIG. 5 shows a system which includes a DNS server, a gateway router, and a load balancer as being within a path between a client and a web server that hosts a website of interest, such a system may not necessarily be included in a path between a client and a web server that hosts a website of interest. That is, in one embodiment, the system may be remote and effectively not a part of the network between the client and the web servers.

A network within which autonomous systems support containers that have the same IP address has generally been described as being a TCP/IP network that enables TCP sessions. The same IP address may generally be used in any system that includes autonomous systems which support shared IP addresses. In other words, the assignment of the same IP address to different web servers is not limited to being used within TCP/IP networks.

In general, the steps associated with methods of the present invention may vary widely. Steps may be added, removed, altered, and reordered without departing from the spirit or the scope of the present invention. For example, when selecting a network path between a client and web servers associated with a website, i.e., when a path for the client to use to access a website is to be selected, all unavailable paths may first be eliminated from consideration. That is, in lieu of identifying the path with the lowest cost and then determining whether the path is available, available paths may first be identified, and the lowest cost path of the available paths may then subsequently be identified. Therefore, the present examples are to be considered as illustrative and not restrictive, and the invention is not to be limited to the details given herein, but may be modified within the scope of the appended claims.

What is claimed is:

1. A method of providing access to a resource, the resource being associated with a domain name, the method comprising:
    identifying from among a plurality of web servers between which packets are routed via a gateway protocol, a first web server in a first autonomous system for use in establishing a session to access the resource at an IP address at which the resource is also hosted in a second autonomous system by a second web server in the plurality of web servers, at least based on determining whether the first web server allows the resource to be accessed, by one or more processors checking whether links and nodes to the first web server are functional;
    wherein the first autonomous system comprises a first IP address list that includes at least said IP address, said IP address being associated in the first autonomous system with the first web server, the first web server being the only web server which is active at any given time at said IP address in the first autonomous system; and
    wherein the second autonomous system comprises a second IP address list that includes at least said IP address, said IP address being associated in the second autonomous system with the second web server.

2. The method of claim 1 further comprising:
    receiving a request to access the resource prior to said identifying.

3. The method of claim 1 wherein:
    the domain name is associated with the IP address.

4. The method of claim 1 further comprising, prior to said identifying:
    determining that a first path between a client and the first web server has a lower cost than a second path between the client and the second web server.

5. The method of claim 1 further comprising, prior to said identifying:
    determining at least a first distance associated with a first path between a client and the first web server and a second distance associated with a second path between the client and the second web server, and determining that the first path is shorter than the second path.

6. The method of claim 1 further comprising, prior to said identifying:
    determining that a first path between a client and the first web server is active and a second path between the client and the second web server is inactive.

7. The method of claim 1 further comprising, prior to said identifying:
    determining that the first web server has a lighter load than the second web server.

8. The method of claim 1 further comprising:
    calculating a first cost value for a first path between a client and the first web server;
    calculating a second cost value for a second path between the client and the second web server;
    when the first cost value is less than the second cost value, selecting the first path as a lowest cost path and the second path as an alternative path;
    when the second cost value is less than the first cost value, selecting the second path as the lowest cost path and the first path as the alternative path;
    determining whether the lowest cost path has available bandwidth to connect to the client; and
    when the lowest cost path is operational and does not have available bandwidth, not permitting the client to access the resource via the lowest cost path.

9. The method of claim 8 further comprising:
    when not permitting the client to access the resource via the lowest cost path, allowing the client to access the resource via the alternative path.

10. The method of claim 1 wherein the links and nodes to the first web server are in a first path thereto, and the method further comprises:
    when a node failure or a link failure is identified in the first path, a second path is used to access the resource in the second autonomous system without requiring that IP address change propagation occur.

11. One or more non-transitory computer-readable media for providing access to a resource, the resource being associated with a domain name, the one or more non-transitory computer-readable media comprising instructions that when executed in one or more computers cause the one or more computers to:
    identify from among a plurality of web servers between which packets are routed via a gateway protocol, a first web server in a first autonomous system for use in establishing a session to access the resource at an IP address at which the resource is also hosted in a second autonomous system by a second web server in the plurality of web servers, at least based on determining whether the first web server allows the resource to be accessed, by one or more processors checking whether links and nodes to the first web server are functional;
    wherein the first autonomous system comprises a first IP address list that includes at least said IP address, said IP address being associated in the first autonomous system with the first web server, the first web server being the only web server which is active at any (liven time at said IP address in the first autonomous system;
    wherein the second autonomous system comprises a second IP address list that includes at least said IP address, said IP address being associated in the second autonomous system with the second web server.

12. The one or more non-transitory computer-readable media of claim 11 further comprising instructions to cause the one or more computers to:
    receive a request to access the resource prior to said identifying.

13. The one or more non-transitory computer-readable media of claim 11 wherein:
    the domain name is associated with the IP address.

14. The one or more non-transitory computer-readable media of claim 11 further comprising instructions to cause the one or more computers to, prior to executing said instructions to identify:
    determine that a first path between a client and the first server has a lower cost than a second path between the client and the second server.

15. The one or more non-transitory computer-readable media of claim 11 further comprising instructions to cause the one or more computers to, prior to executing said instructions to identify:
    determine at least a first distance associated with a first path between a client and the first server and a second distance associated with a second path between the client and a second server, and determining that the first path is shorter than the second path.

16. The one or more non-transitory computer-readable media of claim 11 further comprising instructions to cause the one or more computers to, prior to executing said instructions to identify:
   determine that a first path between a client and the first server is active and a second path between the client and the second server is inactive.

17. The one or more non-transitory computer-readable media of claim 11 further comprising instructions to cause the one or more computers to, prior to executing said instructions to identify:
   determine that the first server has a lighter load than the second server.

18. The one or more non-transitory computer-readable media of claim 11 further comprising instructions to cause the one or more computers to:
   calculate a first cost value for a first path between a client and the first server;
   calculate a second cost value for a second path between the client and the second server;
   when the first cost value is less than the second cost value, select the first path as a lowest cost path and the second path as an alternative path;
   when the second cost value is less than the first cost value, select the second path as the lowest cost path and the first path as the alternative path;
   determine whether the lowest cost path has available bandwidth to connect to the client; and
   when the lowest cost path is operational and does not have available bandwidth, not permit the client to access the resource via the lowest cost path.

19. The one or more non-transitory computer-readable media of claim 11 wherein the links and nodes to the first web server are in a first path thereto, and wherein:
   when a node failure or a link failure is identified in the first path, a second path is used to access the resource in the second autonomous system without requiring that IP address change propagation occur.

20. A system for providing access to a resource, the system comprising:
   means for identifying from among a plurality of web servers between which packets are routed via a gateway protocol, a first web server in a first autonomous system for use in establishing a session to access the resource at an IP address at which the resource is also hosted in a second autonomous system by a second web server in the plurality of web servers, at least based on determining whether the first web server allows the resource to be accessed, by one or more processors checking whether links and nodes to the first web server are functional;
   wherein the first autonomous system comprises a first IP address list that includes at least said IP address, said IP address being associated in the first autonomous system with the first web server, the first web server being the only web server which is active at any given time at said IP address in the first autonomous system; and
   wherein the second autonomous system comprises a second IP address list that includes at least said IP address, said IP address being associated in the second autonomous system with the second web server.

21. The method of claim 1 further comprising:
   checking whether the links and nodes to the first web server are functional subsequent to establishment of the session.

22. The one or more non-transitory computer-readable media of claim 11 further comprising instructions to:
   check whether the links and nodes to the first web server are functional subsequent to establishment of the session.

* * * * *

UNITED STATES PATENT AND TRADEMARK OFFICE
CERTIFICATE OF CORRECTION

PATENT NO. : 8,706,906 B2
APPLICATION NO. : 13/415518
DATED : April 22, 2014
INVENTOR(S) : Hoynowski et al.

Page 1 of 1

It is certified that error appears in the above-identified patent and that said Letters Patent is hereby corrected as shown below:

On Title page, column 2, under Other Publications, line 1, delete "Protocok" and insert -- Protocol --, therefor.

On Title page 2, column 2, under Other Publications, line 2, delete "conferecne" and insert -- conference --, therefor.

In the Specification

In column 6, line 18, delete "IF" and insert -- IP --, therefor.

In the Claims

In column 12, line 37, In Claim 11, delete "(liven" and insert -- given --, therefor.

Signed and Sealed this
Fourteenth Day of October, 2014

Michelle K. Lee
*Deputy Director of the United States Patent and Trademark Office*